Jan. 10, 1956                    C. O. GODOY                    2,730,365
                                 STICK HORSE
                            Filed Feb. 27, 1953
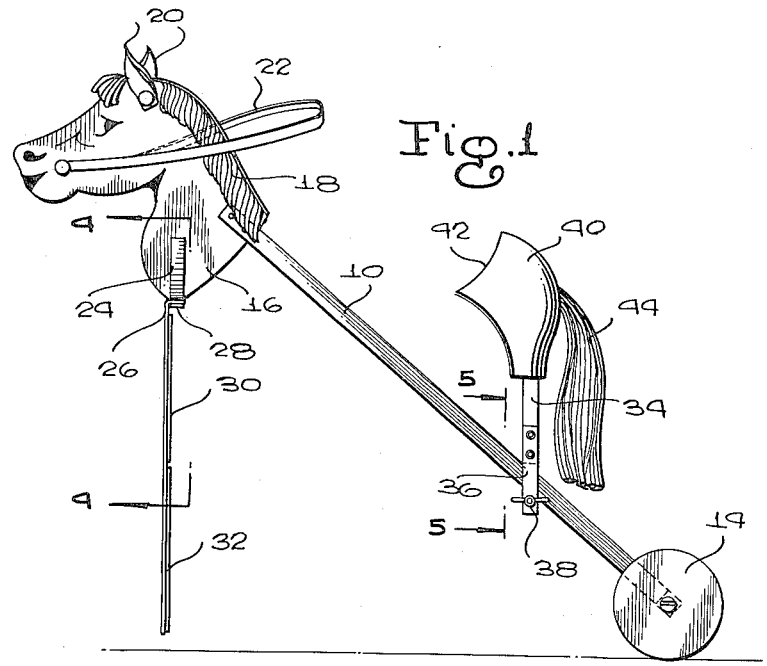
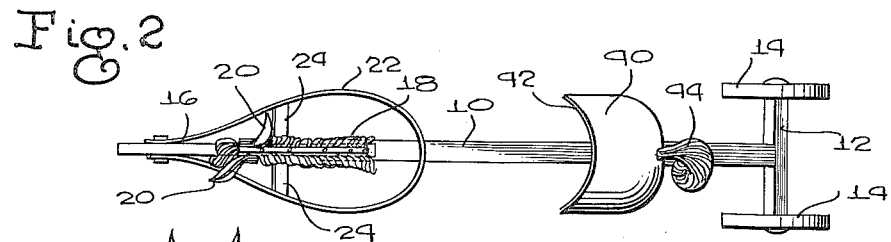
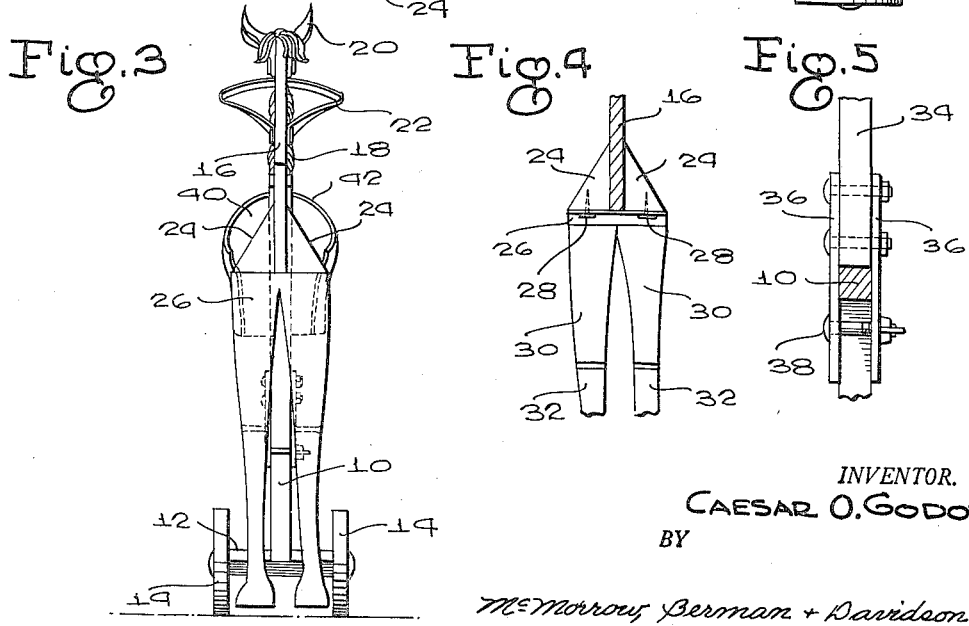
INVENTOR.
CAESAR O. GODOY
BY
McMorrow, Berman + Davidson
ATTORNEYS

United States Patent Office 2,730,365
Patented Jan. 10, 1956

2,730,365
STICK HORSE

Caesar Ortega Godoy, Los Angeles, Calif.

Application February 27, 1953, Serial No. 339,371

2 Claims. (Cl. 272—1)

This invention relates to a toy stick horse. More particularly, the invention has reference to a stick horse of inexpensive construction having a realistically formed seat member, and having, additionally, a front leg action novelly designed to make the horse highly attractive to a child using the same.

It is clearly important that a stick horse be constructed as inexpensively as possible, to increase the commercial feasibility thereof. At the same time, it is of course desirable that the stick horse be made attractive to children, and therefore, one important object of the present invention is to provide a stick horse in which a front leg assembly will be incorporated, said assembly being very inexpensive but being, at the same time, adapted to provide a highly realistic leg action when the horse is in use.

Another object of importance is to provide a seat member for a stick horse which, though also inexpensively formed, will provide a faithful simulation of the hind part of a horse, the seat member being of hollowed, molded formation and having an external configuration closely simulating said hind part.

Still another object is to provide, in a stick horse, means for adjusting the seat member longitudinally of the main support bar of the horse, thereby to adapt the horse for use by children of different sizes.

Other objects will appear from the following description, the claims appended thereto, and from the annexed drawing, in which like reference characters designate like parts throughout the several views, and wherein:

Figure 1 is a side elevational view;
Figure 2 is a top plan view;
Figure 3 is a front elevational view;
Figure 4 is a transverse sectional view on line 4—4 of Figure 1, showing the front leg assembly; and
Figure 5 is an enlarged transverse sectional view on line 5—5 of Figure 1, showing the mounting of the seat member on the support bar.

The stick horse constituting the present invention includes an elongated main support bar 10 which, as shown in Figure 5, is square in cross section. The main support bar 10, at its rear end, is fixedly connected to the midlength portion of a transversely disposed axle 12, the axle 12 projecting laterally in opposite directions from the main support bar and having wheels 14 rotatably mounted thereon.

A head member has been designated by the reference numeral 16, and can be cut to shape from wooden board stock or the like. Alternatively, the head member could, if desired, be of molded plastic or any other material found suitable.

In any event, the head member 16, as shown in Figure 1, is cut to an external configuration which will simulate closely the head and neck of a horse, the opposite side surfaces of the head member being painted, printed, or otherwise provided with eyes, nostrils, mouth, etc. A mane 18 can either be painted upon the head member, or formed of string, hair, or the like. Ears 20, of imitation leather or the like, are pivotally connected to the top portion of the head member, and thus, a realistic simulation of the fore part of a horse is provided.

A rein 22 is attached to the head member, and extends rearwardly therefrom, so as to be conveniently grasped by a child.

The stick horse constituting the present invention includes a front leg assembly carried by the head member 16. The leg assembly includes, at its upper end, triangular leg support members 24. The members 24 project laterally from and are fixedly connected to the opposite surfaces of the head member 16, at the lower end of said head member, and as will be noted from Figure 3, the leg support members are each formed as a right triangle, the bottom edges of said leg support members being coplanar and horizontally disposed.

Attached at its upper end to the leg support members 24 is a fabric backing 26. The backing 26 can be appropriately considered as being formed substantially in the shape of an inverted U, the bight portion of the backing being connected by nails 28 or equivalent fasteners to the coplanar bottom edges of the leg support members 24.

Those portions of the backing depending from the bight thereof are externally shaped to simulate a horse's legs, and to the back surfaces of the depending backing portions I attach stiffening pieces 30, 32. The stiffening pieces can be formed of cardboard or the like, and can be adhesively connected to the fabric backing, the stiffening pieces having their opposite side edges in registration with the respective side edges of the depending portions of the backing.

As will be noted from Figure 4, the stiffening pieces 30, 32 are spaced closely apart intermediate the opposite ends of the depending backing portions, so as to define relatively narrow flexible areas extending transversely of each depending backing portion.

By reason of this construction, the legs of the horse will be articulated at the knee joints, and as a result, when the stick horse is in use, up and down movement of the head member 16 will cause the legs to flex at the knees, thereby providing a realistic simulation of the front leg action of a horse.

It is important to note, in this regard, that in providing the realistic leg action, I have, at the same time, designed a very inexpensive front leg construction that will reduce measurably the cost of the toy, thereby to add considerably to its commercial feasibility.

A seat member is also provided on the horse, and includes an upstanding post 34 of rectangular cross section. The post 34 extends upwardly from the main bar 10, and at its lower end, is formed with longitudinally spaced, transverse openings receiving fastening elements, said fastening elements extending through spaced openings formed in the upper ends of connecting bars 36. The connecting bars 36 embrace between them the main bar 10, as best shown in Figure 5, the free or lower ends of the connecting bars projecting below the main support bar. Extending between the free ends of the connecting bars 36 is a clamping bolt 38, provided with a wing nut.

By reason of this construction, it will be seen that the seat member can be adjusted longitudinally of the support bar 10, and can be clamped to the support bar 10 in each position to which it is adjusted. Further, the seat member can also be adjusted to selected inclinations from the vertical, should this latter adjustment be desired.

Fixedly connected to the upper end of post 34 is a top piece 40. This can be formed from papier mache.

As will be noted from Figures 1, 2, and 3, the top piece 40 is generally hollow, and externally, is formed in the simulation of the hind part of a horse. The front edge 42 of the top piece is of arcuate formation, and is curved inwardly, as shown in Figure 2, to receive the body of the child.

By reason of this arrangement, the child can support himself against the top piece, and when doing so, will appear to be sitting upon the horse. When the horse is at rest, the child can, in fact, support his weight against the top piece to a certain extent.

To further provide for a faithful simulation, a tail 44 of string or hair has its upper end extended through an opening formed in the top piece 40, said upper end of the tail being knotted within the top piece to prevent accidental removal.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A stick horse comprising an axle supported by a pair of wheels, a main bar having one end fixedly connected to the intermediate portion of said axle, an upstanding post carried by said bar inwardly of and spaced from said axle, a seat member formed in the simulation of the hind part of a horse secured to said post, a head member formed in the simulation of the forepart of a horse secured to the other end of said bar, and legs depending from said head member and adapted to flex freely at locations intermediate their ends to simulate the movements of a horse, said legs including a fabric backing attached to said head member and stiffening pieces attached to said backing and spaced longitudinally thereof to articulate the legs.

2. A stick horse comprising an axle supported by a pair of wheels, a main bar having one end fixedly connected to the intermediate portion of said axle, an upstanding post carried by said bar inwardly of and spaced from said axle, a seat member formed in the simulation of the hind part of a horse secured to said post, a head member formed in the simulation of the forepart of a horse secured to the other end of said bar, and legs depending from said head member and adapted to flex freely at locations intermediate their ends to simulate the movements of a horse, said legs including a fabric backing shaped substantially as an inverted U with its bight attached to said head member, said legs further including stiffening pieces attached to those portions of the backing depending from the bight thereof, the stiffening pieces of each backing portion being spaced closely apart intermediate the ends of said portion to provide an articulated knee joint on each of said legs.

References Cited in the file of this patent

UNITED STATES PATENTS

| | | |
|---|---|---|
| 230,749 | Crandall | Aug. 3, 1880 |
| 453,673 | Snyder | June 9, 1891 |
| 723,438 | Betts | Mar. 24, 1903 |
| 1,914,732 | Breault | June 20, 1933 |
| 1,922,466 | Yoes | Aug. 15, 1933 |
| 2,571,266 | Levay | Oct. 16, 1951 |
| 2,585,279 | Sickelbower | Feb. 12, 1952 |